April 26, 1960  F. H. NUMRICH  2,934,642
SIGNAL DETECTION CIRCUIT
Filed Dec. 5, 1956  2 Sheets-Sheet 1

Inventor
FRED H. NUMRICH
By Alfred C. Hill
Agent

Inventor
FRED H. NUMRICH
By Alfred C. Hill
Agent

United States Patent Office 2,934,642
Patented Apr. 26, 1960

2,934,642
SIGNAL DETECTION CIRCUIT

Fred H. Numrich, Clifton, N.J., assignor to International Telephone and Telegraph Corporation, Nutley, N.J., a corporation of Maryland Application December 5, 1956, Serial No. 626,507

2 Claims. (Cl. 250—27)

This invention relates to signal detection circuits and more particularly to a signal detection circuit operating on the basis of coincidence of signals.

Circuits have heretofore been described which detect the presence or absence of signals using coincidence techniques, many of such circuits have included a plurality of devices, such as diode gates, responsive to individual signals to control the conduction of a discharge device which charges a condenser in the cathode circuit thereof to a predetermined value. This predetermined value is reached only when all of the individual signals as applied to said device are in time coincidence. When the condenser reaches this predetermined value, a second discharge device is caused to conduct. The conduction of this second discharge device activates a relay in the anode circuit thereof which in turn momentarily operates an indicator, such as a lamp, thereby providing a momentary indication of coincidence of the individual signals. The number of components of this type of prior art circuit is relatively large, employs an electromechanical relay and has a relatively high power consumption. All of these factors reduce the reliability of a signal detection circuit and increase the complexity thereof. In addition, the momentary operation of a lamp employed as an indicator further reduces the reliability of observing either visually or photographically the occurrence of coincidence of the individual signals.

Therefore, it is an object of this invention to provide an improved signal detection circuit.

A feature of this invention is to provide a relatively simple signal detection circuit.

Another feature of this invention is to provide a signal detection circuit having relatively low power consumption.

Still another feature of this invention is to provide a signal detection circuit having improved reliability.

A further feature of this invention is to provide a signal detection circuit providing a prolonged indication of the occurrence of prescheduled coincidence between two signals, whereby an observing device can more readily recognize this.

A more specific feature of this invention is the provision of a signal detection device comprising a coincidence device coupled to a first signal source and at least a second signal source supplying reference signals. The coincident device is operative in response to the coincidence of signals from said sources and controls the operation of a time constant electrical energy storage system to vary the level of electrical energy in said time constant storage system. The device further includes an indicating means coupled to said energy storage system to indicate the level of electrical energy in said system.

Still a more specific feature of this invention is the provision of a multigrid thyratron as the coincidence device and a gas tube indicator as the indicating means of the detection circuit above described.

The above-mentioned and other features and objects of this invention will become more apparent by reference to the following description taken in conjunction with the accompanying drawings, in which.

Figure 1:
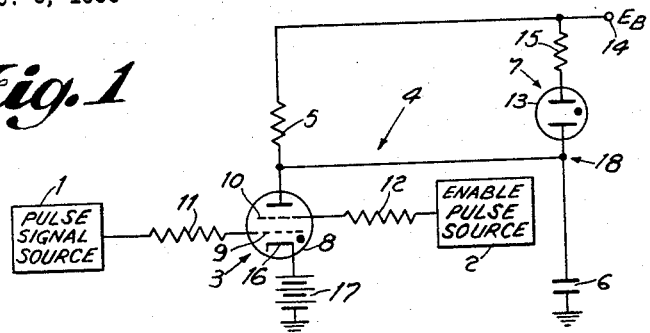
Fig. 1 is a schematic diagram of a signal detection device embodying this invention.

Referring to Fig. 1, the signal detection device of this invention is illustrated as comprising a signal source 1, a signal source 2 supplying reference signals and a coincidence device 3 coupled to sources 1 and 2 and operative in response to the coincidence of the signals from sources 1 and 2. A time constant electrical energy storage system 4 including resistor 5 and capacitor 6 is coupled to coincidence device 3 and responsive to the operation of device 3 to vary the level of the electrical energy in system 4. An indicating means 7 coupled to system 4 indicates predetermined levels of electrical energy in system 4.

More specifically, the signal detection device of this invention includes a thyratron 8 having at least two control grids 9 and 10. Signals of source 1 are coupled through limiting resistor 11 to control grid 9 and signals of source 2 are coupled through limiting resistor 12 to control grid 10. The signals of source 1 are pulse signals having different recurrence frequencies, and the signals of source 2 are enable or gate pulses having a predetermined schedule of timed occurrence. Coincidence of the signals from sources 1 and 2 on the grids 9 and 10, respectively, cause thyratron 8 to conduct which discharges the time constant system 4 to below a predetermined level which will cause indicator 7 to operate. Indicator 7 may be a gas indicating tube 13. A voltage source supplies a voltage at terminal 14, identified as $F_B$, which is impressed upon resistor 5, a portion of the time constant system 4 and upon the gas indicator tube 13 through limiting resistor 15. The cathode 16 of thyratron 8 is coupled to a bias voltage source 17 and hence to a reference potential such as ground. The condenser 6 of the time constant system 4 is also coupled to the reference potential. The bias voltage source 17 is not necessary if the pulses of sources 1 and 2 have a negative reference voltage. In such an instance, the cathode 16 would be directly connected to the ground or reference potential.

Figure 2:
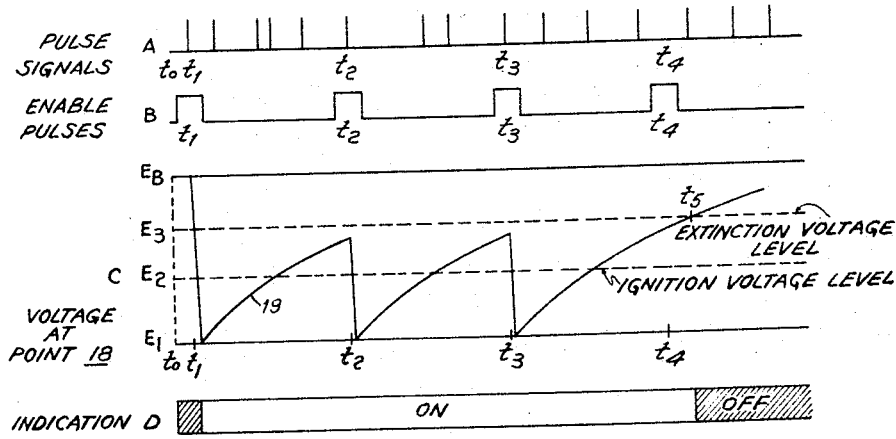
Fig. 2 is a set of curves used in explaining the operation of the circuit of Fig. 1.

Fig. 2 illustrates a set of curves used herein to facilitate the understanding of the operation of the circuit of Fig. 1. Pulse signals of source 1 are represented in curve A, Fig. 2, and the enable or gate pulses of source 2 may be represented by the pulses of curve B, Fig. 2, the latter having a regular repetition rate. It is to be understood, however, that the timing between adjacent pulses of source 2 may be any prescheduled time displacement depending upon the end result desired from the circuit of Fig. 1. The time displacement between adjacent pulses of source 2 may have a logarithmic time displacement, or a displacement defined by any other mathematical function, or a random relationship that will produce the desired pulse signal detection.

In the initial condition, such as shown at $t_0$, curve C, Fig. 2, thyratron 8 is not conducting; therefore, capacitor 6 is charged through resistor 5 from voltage source $E_B$ until the voltage at point 18 is equal to $E_B$. Since the gaseous indicator 13 has a voltage equal to $E_B$ on each terminal, the net voltage across indicator 13 is zero, and therefore it does not glow.

In order to ignite thyratron 8, the voltage on both control grids 9 and 10 must be zero or positive with respect to cathode 16. This condition is satisfied when a gate or enable pulse is present on grid 10 and a signal pulse is present on grid 9, simultaneously, as indicated at time $t_1$ in curves A and B, Fig. 2. When thyratron 8 ignites, capacitor 6 discharges therethrough, thereby reducing the voltage at point 18 to level $E_1$ substantially as illustrated in curve C, Fig. 2. Since one end of indicator 13 is always at a voltage level $E_B$, the indicator will glow when the voltage at the other terminal, point 18, is $E_2$ or less, where $E_B-E_2$ is the breakdown or ignition voltage of the gaseous indicator. Therefore, the indicator will start to glow at time substantially $t_1$ when the voltage at point 18 drops to voltage $E_2$. When the signal pulse supplied from source 1 decreases to a negative voltage, thyratron 8 ceases to conduct. Immediately, capacitor 6 begins to charge through resistor 5 as illustrated in curve C, Fig. 2 by line 19.

If the voltage at point 18 should reach a level $E_3$, where $E_B-E_3$ equals the extinction voltage of indicator 13, the indicator would no longer glow. However, the time constant of resistor 5 and capacitor 6 is so chosen that before level $E_3$ is reached, the pulse signal being monitored has repeated its cycle so that another signal pulse and gate pulse are applied simultaneously to grids 9 and 10 of thyratron 8. This causes capacitor 6 to discharge and the indicator 13 continues to glow. This action is illustrated in curves A, B and C, Fig. 2 at times $t_2$ and $t_3$.

Should the proper pulse of a pulse signal fail to appear during the next cycle, the voltage at point 18 would continue to rise above level $E_3$ and the indicator would cease to glow. As illustrated in curves A, B and C, Fig. 2, at time $t_4$ a pulse of the signal pulse fails to occur in coincidence with the enable or gate pulse of source 2. The charging of capacitor 6 then passes level $E_3$ as illustrated at $t_5$, curve C, Fig. 2 and causes indicator 13 to extinguish. Indicator 13 will remain in the "off" indication until coincidence between a pulse of the pulse signal and a pulse of the enable signal again occurs on grids 9 and 10 of thyratron 8.

By a proper choice of time constants and an indicator whose ignition and extinction voltages remain substantially constant, the circuit will indicate the absence of a single pulse from a pulse signal. This would be useful for monitoring by continuous film recording.

The advantages of this circuit include the following. The detection circuit is simple and it will be recognized that a small number of components are used. There are no bulky components, such as relays and the circuit is ideal for subminiaturizing since thyratron tubes are available in subminiature size. The detection circuit has a lower power consumption than the prior art detection circuits which permits a smaller power supply and greatly reduces heat problems. The necessary gating action is accomplished within the thyratron or coincident device itself not by external gate devices. This makes available a relatively large saving in diode gates previously employed in signal detection circuits. The detection circuit further enables a continuous or prolonged conduction of a gaseous indicator and thus gives us a continuous or prolonged indication of the presence of the pulse signal being monitored or detected. This advantage permits a high relative brightness without sacrificing indicator life. The signal detection circuit is capable of operating with relatively narrow pulses. Any width pulse may be employed provided that its duration is greater than the ionization time of thyratron 8. Last but not least, the signal detection circuit has the advantage of improved reliability. The reduction in the total number of components, the elimination of mechanical parts, such as relays, the reduced number of gates and the low power consumption combine to give a greatly increased reliability.

Figure 3:
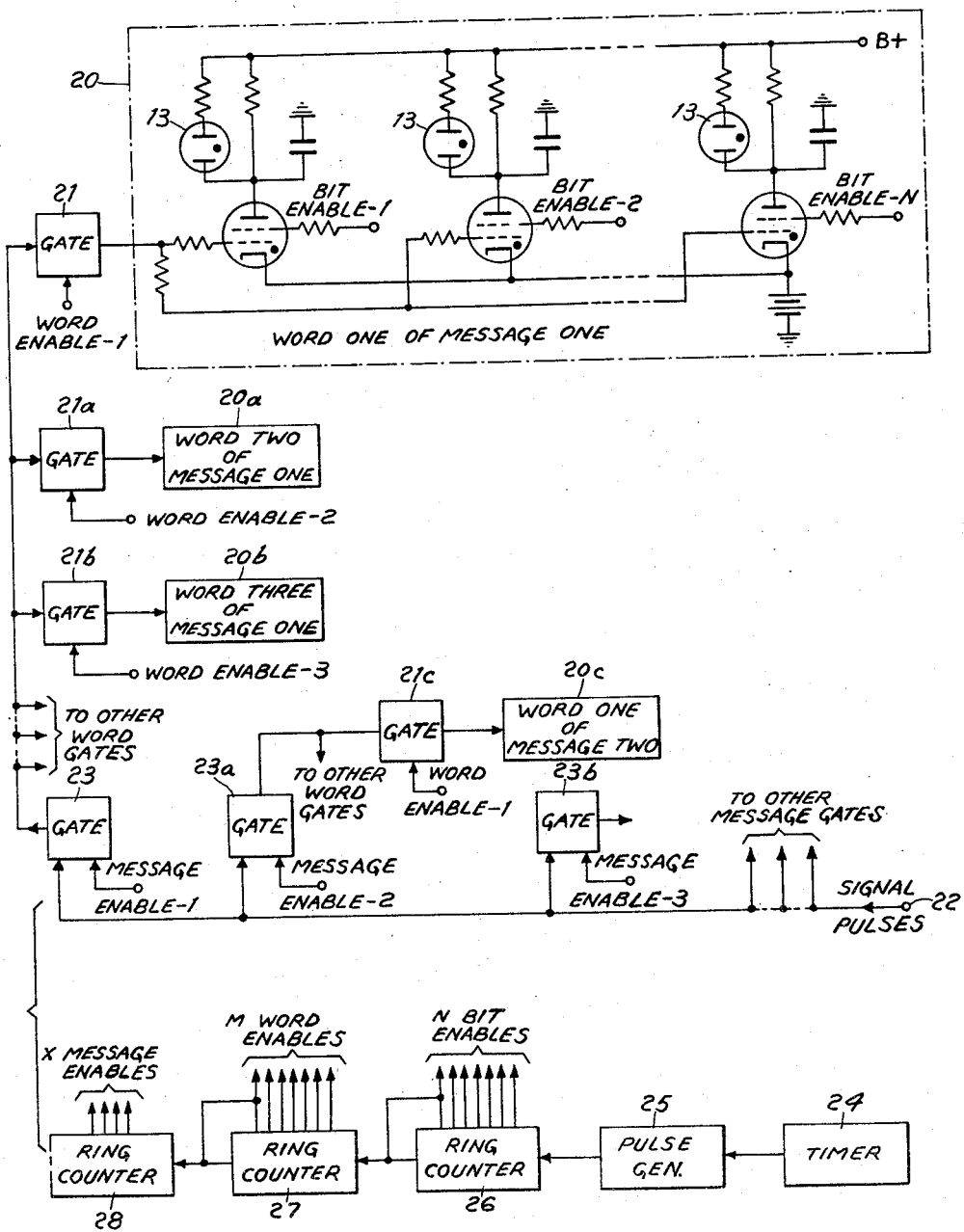
Fig. 3 is a block diagram, partially schematic, of a pulse read-out system employing a plurality of the circuits of Fig. 1.

The signal detection circuit of Fig. 1 is most useful in complex systems where many indicators are required. An example of such a complex system is illustrated in Fig. 3. A pulse readout system is disclosed which uses groups of enables or gate pulses where there are "bit" enables wider than, and preferably several times the width of, the pulse signals, "word" enables having a width of N "bit" enables, and "message" enables having a width of M "word" enables. In such a system, if M and N are each equal to 10, a total of 1,000 detection circuits would be required. This can be accomplished by building 10 detection circuits on a chassis. Then each chassis could handle one "word" of a message. The chassis referred to is indicated by boxes 20, 20a, 20b, and 20c. Thus, each chassis 20 would only require a simple gate 21, 21a, 21b, and 21c consisting of two diodes as compared to some existing systems using three diodes per detection circuit or 30 per chassis.

Figure 4:
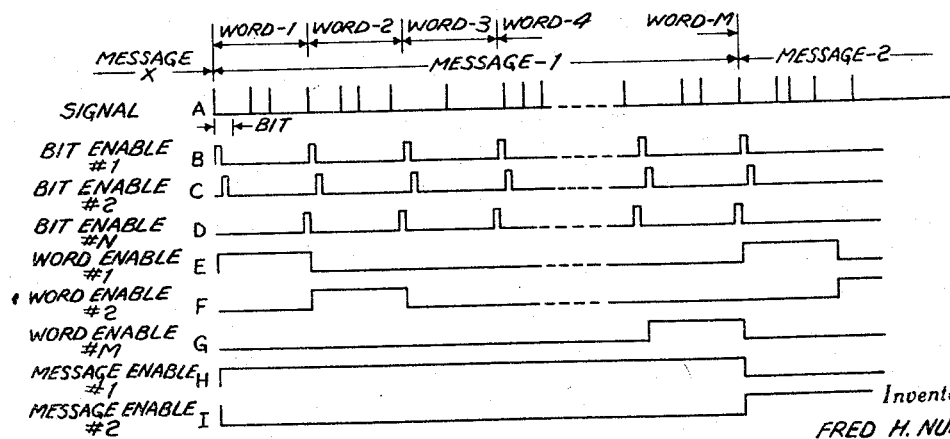
Fig. 4 is a set of curves used in explaining the operation of the system of Fig. 3.

The operation of the system of Fig. 3 can be understood by reference to Fig. 4 and the following description. The signal pulses are coupled to terminal 22, Fig. 3 and include a plurality of "messages" substantially as indicated in curve A, Fig. 4. Each one of these messages include a plurality of "words" and each of the words include a plurality of "bits." The information carried by the words may be, for example, such things as speed, heading, bearing, altitude, and so forth. The information contained in the "words" are provided by the "bits" or pulses which indicate discrete digits of the "words." The signal pulses at terminal 22 are coupled to each of the "message" gates 23, 23a and 23b. An appropriately timed "message" enable as illustrated in curve H of Fig. 4 opens a message gate, for instance, gate 23 and permits the information of message one to pass to the "word" gates of message one, such as gates 21, 21a and 21b. Each one of the "word" gates 21 has applied thereto an appropriately timed "word" enable substantially as illustrated in curves E, F, and G, Fig. 4. Thus, each one of the "word" enables will sample in sequence the "word" gates to pass the "bit" information of the "words" to the chassis 20. The chassis 20 includes a plurality of signal detection circuits as described in connection with Fig. 1, which are in turn sampled in sequence by "bit" enables, such as illustrated at curves B, A and D of Fig. 4 to give an indication at indicators 13 whether that "bit" is present or not. If the "bit" is present, the corresponding indicator 13 will be lit; if the "bit" is not present, this indicator will not be lit. Let us assume that each chassis includes ten signal detection circuits and that the "bit" information is sent on a decimal basis. Thus, by observing visually or photographically indicators 13, it will be possible to determine the information sent in the "word." This information may be the value of the speed and other information that may be included in a "word" of a "message."

The various enables, the "message" enable, the "word" enable and the "bit" enable, must be properly timed and synchronized to perform the desired pulse readout of the system of Fig. 3. The received signal must be synchronous with the various enables. The reference pulses may be generated by what is commonly called a "clock." This consists of an oscillator or timer 24 whose period of oscillation is equal to the time of the "bit" enable. This is coupled to pulse generator 25 to produce pulses having a width on the order of 1/10 the width of a "bit" enable. These narrow pulses are applied to a ring counter 26. There is an output at each stage of counter 26 which becomes the "bit" enables. The output of the last "bit" enable then triggers a ring counter 27 which similarly produces "word" enables. The last output ("word" enable) of counter 27 triggers a ring counter 28 to produce "message" enables. Fig. 4, curves B to I illustrates the production of the various enables. The "bit," "word" and "message" enable outputs of the ring counters are coupled to the appropriate gates and detection circuits to accomplish the required timing of operation.

When the signal detection circuit of this invention is employed in a complex system as illustrated in Fig. 3, it is rather obvious that this simple signal detection circuit provides a relatively large saving in components, particularly gating components, as pointed out hereinabove.

The indication obtained at each one of the detection circuits is prolonged due to the time constant of the time constant system and therefore provides an improved facility for recording or recognition of each pulse present.

While I have described above the principles of my invention in connection with specific apparatus, it is to be clearly understood that this description is made only by way of example and not as a limitation to the scope of my invention as set forth in the objects thereof and in the accompanying claims.

I claim:

1. A signal detection device comprising a signal source having a pulse signal including a plurality of pulse positions spaced by a predetermined time interval, certain ones of said pulse positions having a positive pulse present therein, a source of positive enable pulses recurring at said time interval and time coincident with said pulse positions, a thyratron having an anode, a cathode and two control grids, a reference potential, an anode voltage source, a bias voltage source, a first resistor connecting said anode voltage source to said anode, means connecting the negative terminal of said bias voltage source to said reference potential, means connecting the positive terminal of said bias voltage source to said cathode to maintain said thyratron non-conductive in the absence of time coincident positive pulses on both of said control grids, a condenser connected between said anode and said reference potential, said condenser being charged through said first resistor by said anode voltage source to a voltage substantially equal to the voltage of said anode voltage source during periods of non-conduction of said thyratron substantially longer than said time interval, a gas tube indicator having two electrodes, a second resistor connecting one electrode of said indicator to said anode voltage source, a conductor connecting the other electrode of said indicator to said anode and in series with said condenser, the voltage difference between the voltage stored on said condenser and the voltage of said anode voltage source controlling the discharge of said indicator, a third resistor connecting said source of enable pulses to one of said control grids, and a fourth resistor connecting said signal source to the other of said control grids, time coincidence between an enable pulse of said source of enable pulses and a pulse present in one of the pulse positions of said pulse signal rendering said thyratron conductive during the period of said time coincidence only, the conduction of said thyratron discharging said condenser therethrough providing a voltage difference between the voltage stored on said condenser and the voltage of said anode voltage source sufficient to produce a glow discharge in said indicator, the time constant of said first resistor and said condenser having a predetermined value to maintain said indicator in a discharged condition during the charging cycle of said condenser as long as a pulse is present in successive ones of the pulse positions of said pulse signal to thereby cause a periodic conduction of said thyratron and discharge of said condenser equal to said time interval and to extinguish said indicator in the absence of a pulse in the next adjacent pulse position of said pulse signal due to the lack of conduction of said thyratron and continued charging of said condenser to a voltage sufficient to reduce the voltage difference between the voltage stored on said condenser and the voltage of said anode voltage source to extinguish said indicator.

2. A signal detection device comprising a signal source having a plurality of pulse signals, each of said pulse signals including a plurality of pulse positions spaced by a predetermined time interval and a positive pulse present in certain ones of the pulse positions, said predetermined time interval being different for each of said pulse signals, a source of enable pulses recurring at a time interval equal to the predetermined time interval of a selected one of said pulse signals and time coincident with the pulse positions of said selected one of said pulse signals, a thyratron having an anode, a cathode and two control grids, a reference potential, an anode voltage source, a bias voltage source, a first resistor connecting said anode voltage source to said anode, means connecting the negative terminal of said bias voltage source to said reference potential, means connecting the positive terminal of said bias voltage source to said cathode to maintain said thyratron non-conductive in the absence of time coincident positive pulses on both of said control grids, a condenser connected between said anode and said reference potential, said condenser being charged through said first resistor by said anode voltage source to a voltage substantially equal to the voltage of said anode voltage source during periods of non-conduction of said thyratron substantially longer than the predetermined time interval of said selected one of said pulse signals, a gas tube indicator having two electrodes, a second resistor connecting one electrode of said indicator to said anode voltage source, a conductor connecting the other electrode of said indicator to said anode and in series with said condenser, the voltage difference between the voltage stored on said condenser and the voltage of said anode voltage source controlling the discharge of said indicator, a third resistor connecting said source of enable pulses to one of said control grids, and a fourth resistor connecting said signal source to the other of said control grids, time coincidence between an enable pulse of said source of enable pulses and a pulse present in one of the pulse positions of said selected one of said pulse signals rendering said thyratron conductive during the period of said time coincidence only, the conduction of said thyratron discharging said condenser to a voltage providing a voltage difference between the voltage stored on said condenser and the voltage of said anode voltage source sufficient to produce a glow discharge in said indicator, the time constant of said first resistor and said condenser having a predetermined value to maintain said indicator in a discharged condition during the charging cycle of said condenser as long as a pulse is present in successive ones of the pulse positions of said selected one of said pulse signals to thereby cause a periodic conduction of said thyratron and discharge of said condenser equal to the time interval of said selected one of said pulse signals and to extinguish said indicator in the absence of a pulse in the next adjacent pulse position of said selected one of said pulse signals due to the lack of conduction of said thyratron and continued charging of said condenser to a voltage sufficient to reduce the voltage difference between the voltage stored on said condenser and the voltage of said anode voltage source to extinguish said indicator.

References Cited in the file of this patent

UNITED STATES PATENTS

| | | |
|---|---|---|
| 1,931,028 | Marrison | Oct. 17, 1933 |
| 2,148,578 | Pulls | Feb. 28, 1939 |
| 2,679,617 | Mullaney et al. | May 25, 1954 |
| 2,792,525 | McArdle | May 14, 1957 |
| 2,801,364 | Janssen | July 30, 1957 |